United States Patent
Sorteberg

[15] 3,666,257
[45] May 30, 1972

[54] NEGATIVELY PRELOADED THRUST UNIT

[72] Inventor: Johannes Sorteberg, Sorteberg Controls Corp., 540 Connecticut Avenue, South Norwalk, Conn. 06854

[22] Filed: May 15, 1970

[21] Appl. No.: 37,501

[52] U.S. Cl..............................267/170, 235/200, 267/23, 267/61
[51] Int. Cl............................................................F16f 5/00
[58] Field of Search..............................267/23, 34, 61, 170; 235/200 WB

[56] References Cited

UNITED STATES PATENTS

| | | | |
|---|---|---|---|
| 2,918,214 | 12/1959 | Sorteberg | 235/200 |
| 3,085,744 | 4/1963 | Sorteberg | 235/200 |
| 3,289,933 | 12/1966 | Sorteberg | 235/200 |

Primary Examiner—Drayton E. Hoffman
Attorney—Mattern, Ware and Davis

[57] ABSTRACT

A pressure-responsive load cell comprises an output thrust member coaxially positioned within an externally pressurized bellows. The thrust member is attached to one end of the bellows, passes through and extends beyond the opposite end of the bellows. The portion of the thrust member within the bellows is a hollow cylinder in which a compression spring is located to provide a bias thrust towards the output end of the thrust member. In order to stabilize this inherently unstable configuration and to keep the assembly friction free, a thin, flat, narrow, very flexible metal guide is attached to the end of the bellows to which the thrust member is attached. To increase stability, a second such guide member may be employed. The second guide may be in the same plane as the first guide and separated therefrom by an angle of less than 180° to prevent positive biasing of two guides in one direction and to insure smooth movement of the guided assembly.

7 Claims, 2 Drawing Figures

PATENTED MAY 30 1972 3,666,257

INVENTOR
JOHANNES SORTEBERG

BY

MATTERN WARE AND DAVIS
ATTORNEYS

NEGATIVELY PRELOADED THRUST UNIT

BACKGROUND OF THE INVENTION

In a positively preloaded thrust cell, such as those shown in my U.S. Pat. Nos. 2,643,055 and 2,918,214, a spring resists the outward movement and exertion of force by a thrust rod in response to increased air pressure in the cell. A negatively preloaded thrust unit is desirable in performing certain calculations. In such a unit a spring would produce a force tending to move the thrust rod outward from the cell in cooperation with the air pressure supplied to the cell. When the thrust transmitting member, or thrust rod abuts against a weighbeam, the force transmitted against the weighbeam comprises the sum of the force exerted by the spring and the force exerted by air pressure in the cell.

A negatively preloaded thrust unit of the present invention generally comprises a coil spring located in axial relationship with the thrust rod. However, the spring is flexible and the axial relationship is not rigid and the parts may easily buckle or bend, especially when the coil spring is compressed. If the axial relationship is maintained by a surrounding guide sleeve, buckling of the spring may result in the spring or thrust rod touching or engaging the surrounding guide sleeve thereby causing a frictional effect which is undesirable in the operation of a weighbeam of balance or other related apparatus.

OBJECTS OF THE INVENTION

It is therefore a principal object of the present invention to provide a negatively preloaded power cell which is free from any frictional effects.

It is a further object of the invention to provide a negatively preloaded power cell for use in devices such as my patented weighbeam systems or related devices.

It is yet another object of the invention to provide an adjustable negatively preloaded power cell with the above characteristics.

Other objects of the invention will in part be obvious and will in part appear hereinafter.

THE DRAWINGS

For a fuller understanding of the nature and objects of the invention, reference should be had to the following detailed description taken in connection with the accompanying drawings in which:

FIG. 1 is a vertical-sectional view of an adjustable negatively preloaded pressure-responsive load cell according to my invention; and, FIG. 2 is a cross-sectional view taken along the lines 2—2 of FIG. 1.

The same reference characters refer to the same elements throughout the two views of the drawing.

The invention accordingly comprises the features of construction, combination of elements, and arrangement of parts which will be exemplified in the construction hereinafter set forth, and the scope of the invention will be indicated in the claims.

DETAILED DESCRIPTION OF THE INVENTION

Figure 1:
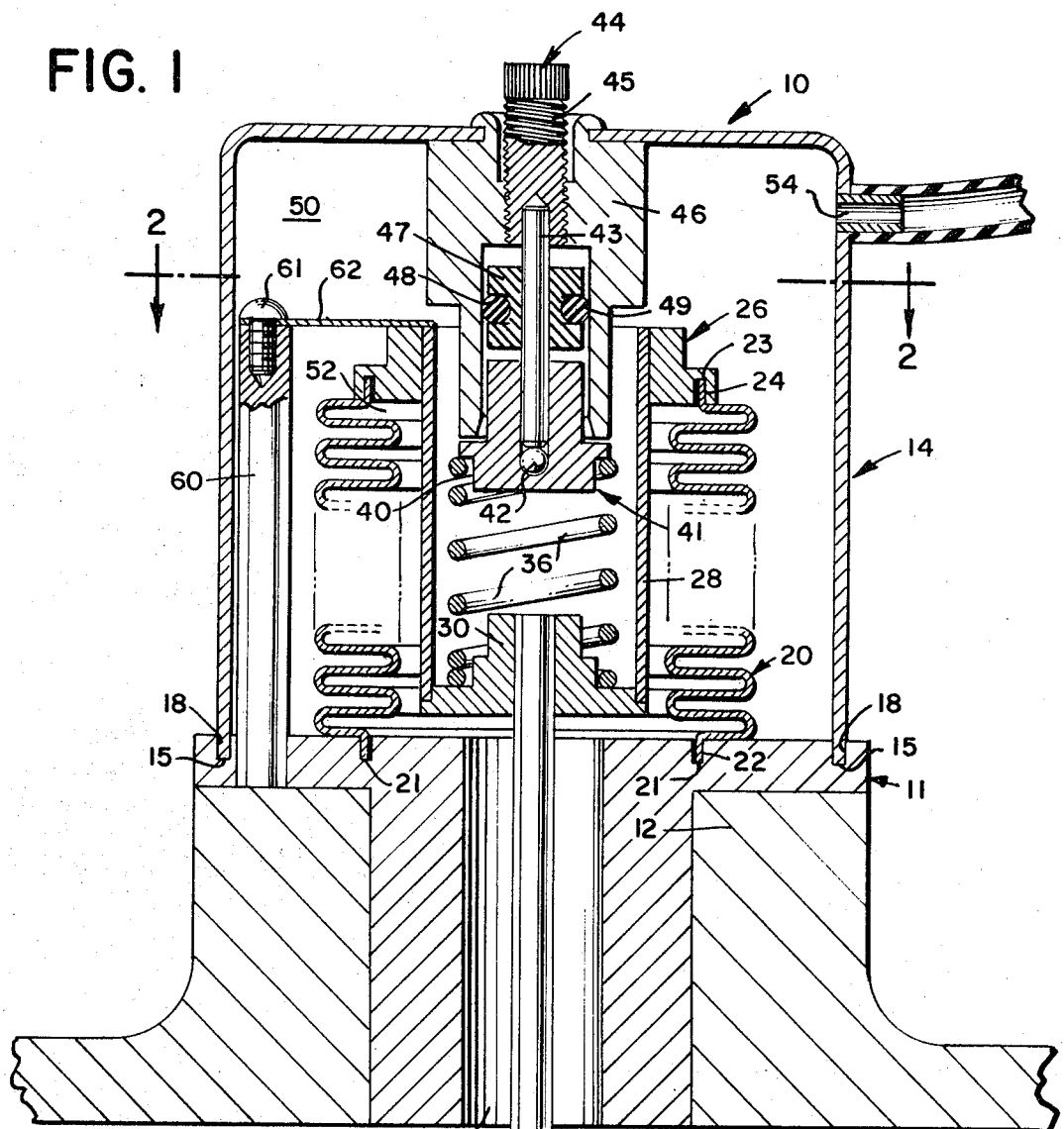

An adjustable negatively preloaded thrust unit is generally indicated at 10 of FIG. 1. This thrust unit comprises first a base 11 constructed for mounting on a device such as my patented weighbeam system, the receptive mounting portion of which is indicated at 12 of FIG. 1. A right circular cylindrical cap 14 is firmly attached to the base 11 by inserting the lower edge 15 into the annular groove 18 formed in the base 11 and soldering or otherwise suitably securing the connection in an airtight manner. The lower edge 21 of a bellows 20 is inserted in an annular groove 22 and also sealed to the base 11. The upper edge 23 of bellows 20 is sealed in a groove 24 formed in a bellows collar 26. A right cylindrical sleeve 28 is fitted in collar 26. Sleeve 28 extends downward from bellows collar 26 inside the bellows 20 and is sealed to a thrust rod collar 30. Sealed in the thrust rod collar 30 and extending through opening 13 formed in the base 11 is a thrust rod 32. All the above-mentioned seals are airtight and made by soldering or the like.

In the operation of the unit the lower end 33 of the thrust rod 32 abuts against a fulcrum pin 37 which is a part of a weighbeam system, a portion of which is indicated at 34. The weighbeam system 34 may be of the type disclosed in my above-mentioned patents. A coil spring 36 is fitted over and engages the stepped annular thrust rod collar 30. The opposite end of this coil spring is similarly fitted over a collar 40 formed on the closed end of bearing housing 41 which receives a ball 42 and a shaft 43 abutting against the ball 42. The shaft 43 extends downward from a bolt 44. The bolt 44 has conventional screw threads 45 which mate with the screw threads on a stud 46 which is firmly sealed to the top of the cap 14. A sealing collar 47 having an annular groove 48 containing an O ring 49 is also pressed and sealed onto rod 43 to seal the space between the rod 43 and the recess in stud 46.

It will thus be seen that a sealed airtight chamber 50 is formed surrounding bellows 20. A fluid is admitted through passage 54 in cap 14 to pressurize or depressurize chamber 50. Chamber 52 communicates with the interior of the weighbeam housing through passage 13 in base 11. The collar 30 and thrust rod 32 receive and transmit force in response to the pressure differential between chambers 50 and 52. In operation the chamber 52 is normally maintained at atmospheric pressure whereas chamber 50 is pressurized according to the weighbeam air pressure balancing system.

A force in addition to that exerted because of the air pressure differential between chambers 50 and 52 as described above is provided by coil spring 36. The spring is compressed by turning bolt 44 into stud 46, thereby producing adjustable movement downward with respect to the top of cap 14 of bolt 44, shaft 43, ball 42, and bearing housing 41 against which spring 36 abuts. When compressed in this manner, spring 36 exerts a force which is transmitted to the weighbeam 34 by collar 30 and thrust rod 32. The force is different for different positions of threaded bolt 44, and thus the force is adjustable.

Spring 36 is a flexible member of the adjustable force-producing means comprising bolt 44, shaft 43, bearing 42, bearing housing 41, collar 30, and thrust rod 32. The maximum downward force for any given position of adjustable bolt 44 is transmitted to the weighbeam when the elements are maintained in axial relationship because the spring is thereby most fully compressed for that given position of bolt 44; however, the system is inherently unstable in that condition and will buckle or bend unless supported. To maintain the accuracy necessary for successful operation of a weighbeam unit, the thrust means must not introduce any unpredictable forces. An example of an unpredictable force producing an inaccurate output from the thrust unit would be to employ a tight sleeve similar to cylindrical sleeve 28 as the axial relationship maintaining member. In such an assembly the sleeve merely restrains the buckling to a minimum. There is a small amount of buckling within the sleeve resulting in contact between the sleeve and the spring, or the thrust rod collar, or both. Such contact with a rigid sleeve prevents buckling and maintains alignment of the adjustable force producing members, but also introduces a frictional effect into the thrust unit's output. The undesirable frictional effect is the result of static and sliding friction between the sleeve and the spring or thrust rod collar.

To eliminate this problem an elongated stud 60 is mounted on base 11 near the perimeter of cap 14. Secured to the top of stud 60 by a bolt 61 or other suitable means is one end of a leaf spring 62. Leaf spring 62 extends perpendicularly to the axis of the thrust unit and is secured to prevent angular motion thereof. It is also securely attached at its opposite end to collar 26. The leaf spring serves to guide the assembly comprising collar 26, spring 28, sleeve 28, collar 30, and thrust rod 32 to maintain thrust rod 32 and spring 36 in axial relationship with the other members of the adjustable force-producing assembly. This prevents bending of the assembly and the accompanying undesirable frictional effect.

Figure 2:
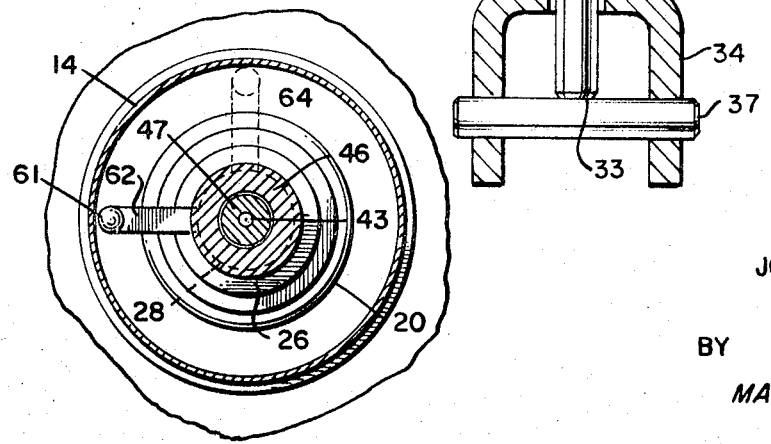

Stud 60 provides a stationary support for one end of leaf spring 62 at the greatest distance from sleeve 28 within cap 14. The mounting position is so chosen because the opposite end of leaf spring 62 moves in an arc. A greater radius of this arc is obtained by using the longest leaf spring which can be conveniently enclosed within cap 14. The greater radius results in an arc more nearly an approximation of a straight axis, and a greater range of up and down movement can be achieved without undesirable contact of the sleeve against other members of the assembly. It may also be desirable to use more than one leaf spring; however, if more than one is used, the second one should not be deployed opposite the first to avoid any buckling or oil can snap-action effect. An effective deployment of a second spring 64 is shown in FIG. 2 by dotted lines.

A negatively preloaded thrust unit of the type described herein having a bellows with a ¼ of 1 square inch effective area can produce thrust forces in the range of 0 to 5 pounds for pressure differentials from 0 to 20 pounds per square inch. In such a unit, the axial movement of the thrust member in response to pressure differentials between the two chambers is less than 0.005 inches as applied to systems. Larger units may be constructed which will produce greater thrust.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A preloaded load cell comprising:
   A. a support base;
   B. a flexible pressure responsive bellows mounted at one end to the support base;
   C. rigid axial mounting means attached at one end to the unmounted free end of said bellows, the other end of the axial mounting means being positioned within and substantially coaxial with said bellows;
   D. a thrust rod attached in axial alignment to said axial mounting means substantially at the other end of said axial mounting means, wherein the axial mounting means and the thrust rod attached thereto seal the unmounted free end of said pressure responsive bellows, and wherein the pressure difference between the inside and the outside of said pressure responsive bellows causes a force to be applied to the thrust rod in a given axial direction;
   E. a spring substantially within and coaxial with said axial mounting means and adjustably compressed between spring mounting means attached to the base and the portion of the axial mounting means to which the thrust rods is attached for applying force to said thrust rod in the given axial direction; and
   F. an axial guide fixed to the axial mounting means near the unmounted free end of said bellows for limiting the radial motion of said axial mounting means transverse to said axial direction, thereby maintaining the axial alignment of the spring, axial mounting means, and thrust rod.

2. A load cell as defined in claim 1, wherein said axial guide has much greater stiffness in a circumferential direction than in said axial direction.

3. A load cell as defined in claim 2, wherein said axial guide comprises a radially disposed thin, flat, narrow piece.

4. A load cell as defined in claim 2, wherein said spring is a coil spring.

5. A preloaded load cell comprising:
   A. a support base;
   B. a flexible pressure responsive bellows mounted at one end to said support base and closed at its other end;
   C. a thrust rod axially aligned within said bellows and attached to the closed end of said bellows wherein the pressure difference between the inside and the outside of said pressure responsive bellows causes a force to be applied to the thrust rod in a given axial direction;
   D. a spring compressed between spring mounting means attached to said base and the closed end of said bellows for applying force to said thrust rod and bellows in the given axial direction; and
   E. an axial guide member rigidly attached to the closed end of said bellows and rigidly attached to mounting means attached to said base for limiting the radial motion of said bellows, rod and spring transverse to said axial direction, thereby maintaining the axial alignment of the spring, bellows and thrust rod.

6. A preloaded load cell as defined in claim 5 wherein there is a pair of said guide members, and the points of attachments of said guide members to said base and to said thrust rod do not cover an angle greater than 180°.

7. A preloaded load cell as defined in claim 5 wherein said axial guide member is an elongated leaf spring mounted orthogonally to the axial relationship to be maintained.

* * * * *